June 28, 1966  J. E. SHARP  3,258,293
CONNECTOR ARM AND THREE-POINT BELT THEREFOR
Filed April 1, 1964  2 Sheets-Sheet 1

INVENTOR.
Jonathan E. Sharp
BY Frank C. Lowe
ATTORNEY

June 28, 1966  J. E. SHARP  3,258,293
CONNECTOR ARM AND THREE-POINT BELT THEREFOR
Filed April 1, 1964  2 Sheets-Sheet 2

INVENTOR.
Jonathan E. Sharp
BY
Frank C. Lowe
ATTORNEY

United States Patent Office 3,258,293
Patented June 28, 1966

3,258,293
CONNECTOR ARM AND THREE-POINT BELT THEREFOR
Jonathan E. Sharp, Littleton, Colo., assignor to Rose Manufacturing Company, Denver, Colo., a corporation of Colorado
Filed Apr. 1, 1964, Ser. No. 356,371
1 Claim. (Cl. 297—389)

This invention relates to safety belts and more particularly to safety belts for automobiles, a primary object of the invention being to provide improved arrangements of automobile safety belts and especially of the buckling and fastening components therefor.

Two types of safety belts used with automobile seats include waist belts which are actually fastened about the pelvis of a wearer and shoulder belts which extend over a shoulder and diagonally across the chest of a wearer. A third, preferable type combines these two into a three-point safety belt, so called because the lower end of the shoulder-belt portion of the combination is connected with an end of the waist-belt portion. The conventional waist belt is ordinarily formed as two straps, each of which extend from a floor anchor from behind the automobile seat, through the seat trough if necessary, and thence over the seat where they may be fastened about the pelvis of a wearer and connected together. The conventional three-point belt, as it will be hereinafter referred to, usually includes the shoulder strap connected to one waist belt strap. These connected straps are then buckle-connected to the second waist belt strap, the anchor strap, at the other side of the seat, or in lieu thereof to a side anchoring arrangement.

The present invention concerns improvements in these belt constructions and an improved rigid or substantially rigid side anchoring arrangement or connector arm in lieu of a waist belt anchor strap. The connected ends of the waist strap and shoulder strap portions of a three-point safety belt are buckled directly to this rigid connective segment. Also it is contemplated that the arrangement may be used with a safety belt having only a waist belt. As will be set forth, a number of advantages are obtained by using this combination, including the fact that the safety belt may be fastened with only one hand, the use of arrangements permitting better retention of the safety belt within the car, the use of compact arrangements of the several components forming the safety belt, and the elimination of a slidedown hazard in a three-point safety belt as where in an accident, the wearer, restrained by the shoulder strap slides downwardly, and the waist strap slips upwardly and above his pelvic bones and into his soft abdominal cavity.

It follows that another object of the invention is to provide a novel and improved rigid connective segment for one side of a safety belt combination which is adapted to permit easier and quicker donning of the safety belt and which permits the belt to be donned with the use of only one hand.

Another object of the invention is to provide a novel and improved rigid connective segment for one side of a safety belt combination which is especially proportioned for use with a three-point belt to place the fastening buckle of the belt at the side of and below the lap level of the wearer and to better balance the embrace of the shoulder strap about the torso of the wearer.

Another object of the invention is to provide a novel and improved three-point safety belt combination having a single strap for both the shoulder strap and the waist strap, combined with a rearrangement of a conventional safety belt buckle on the single strap which permits the disconnect lift lid of the buckle to be advantageously placed above the connecting points of the buckle at the side of the seat. Not only does this permit the wearer to easily reach the buckle, it also permits the single strap to be easily adjusted. The strap is secured on the locking bar of the buckle in a manner which lets the shoulder strap portion yield for adjustment and at the same time tighten the waist strap portion with a pull-up action of the shoulder strap. This tends to eliminate any possibility of the wearer sliding down into the seat and slipping under the waist belt.

Another object of the invention is to provide a novel and improved three-point safety belt combination including a single strap for the waist and shoulder strap portions and having a simple and effective means for adjustment of the strap lengths of both portions of the three-point belt.

Another object of the invention is to provide novel and improved auxiliary constructions for three-point type safety belts which are especially suitable for sport cars and other cars having convertible tops.

Another object of the invention is to provide a novel and improved safety belt arrangement using a rigid connector arm with a waist-type belt on a single automobile seat which is advantageously arranged to permit the belt to be fastened with one hand and to prevent the belts from falling out of the side door when not in use.

Further objects of the invention are to provide in an automobile safety belt construction, a versatile arrangement of the components therefor, and which are also simple, economical, neat-appearing, rugged and durable.

With the foregoing and other objects in view, all of which more fully hereinafter appear, my invention comprises certain constructions, combinations and arrangements of parts and elements as hereinafter described, defined in the appended claim, and illustrated in preferred embodiment in the accompanying drawing in which:

FIGURE 1 is a somewhat diagrammatic, perspective view of a portion of the interior of an automobile of the type having individual seats, with an improved three-point safety belt mounted therein and being connected and positioned over the seat in a manner representative of its position when the belt is being worn by an individual, with broken lines indicating parts otherwise hidden from view, and with arrows indicating certain movements of the belt.

Figure 1:
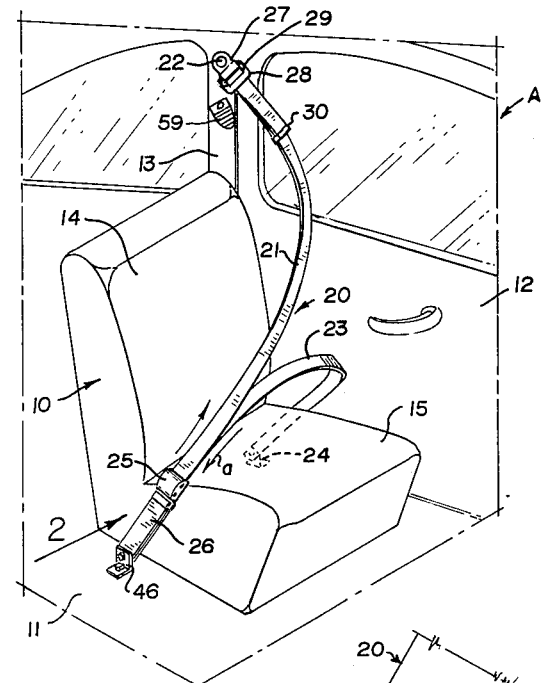
Figure 4:
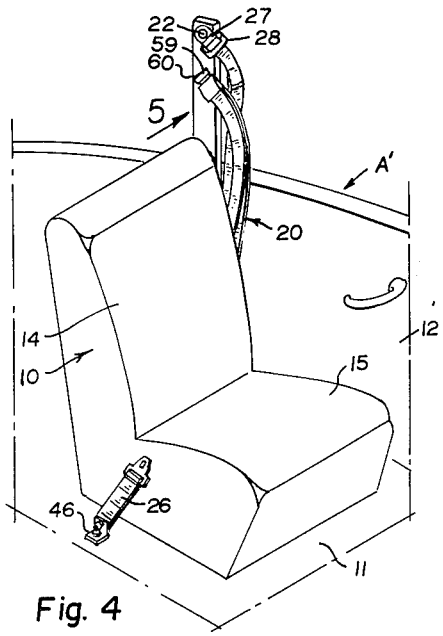

FIGURE 4 is a somewhat diagrammatic, perspective view similar to FIG. 1, but showing a portion of the interior of a convertible type of automobile having individual seats, with the upper portion of the three-point safety belt being mounted upon an improved auxiliary body post which permits the belt to be used with a convertible type of automobile, and with the end of the three-point safety belt being disconnected and secured to a hanger on the post.

Figures 5, 6:
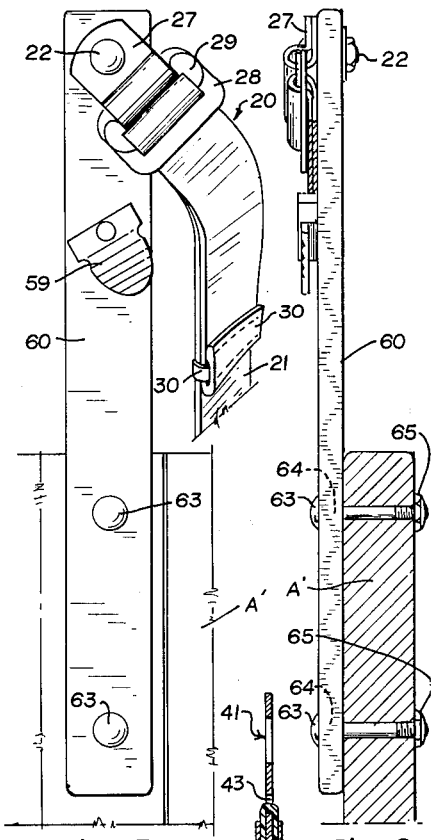

FIGURE 5 is a side elevational view of a portion of the showing at FIG. 4 as taken from the indicated arrow 5 at FIG. 4, but on an enlarged scale and with the end of the belt shown as being disconnected from the hanger to better illustrate construction of the hanger.

FIGURE 6 is a side elevational view of the showing at FIG. 5, but illustrating the portion of the automobile to which the post is connected as being in section.

Figure 7:
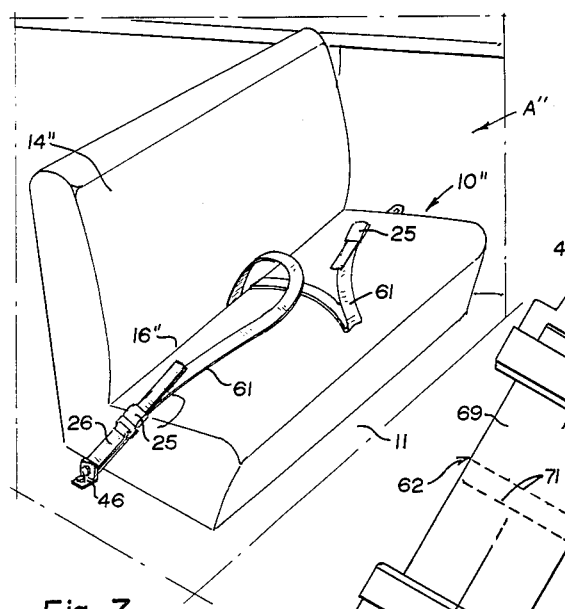

FIGURE 7 is a somewhat diagrammatic, perspective view of a portion of the interior of an automobile of the type having a single, wide seat therein with an improved arrangement of waist-type safety belts, using the connecting components disclosed in this invention.

Figure 2:
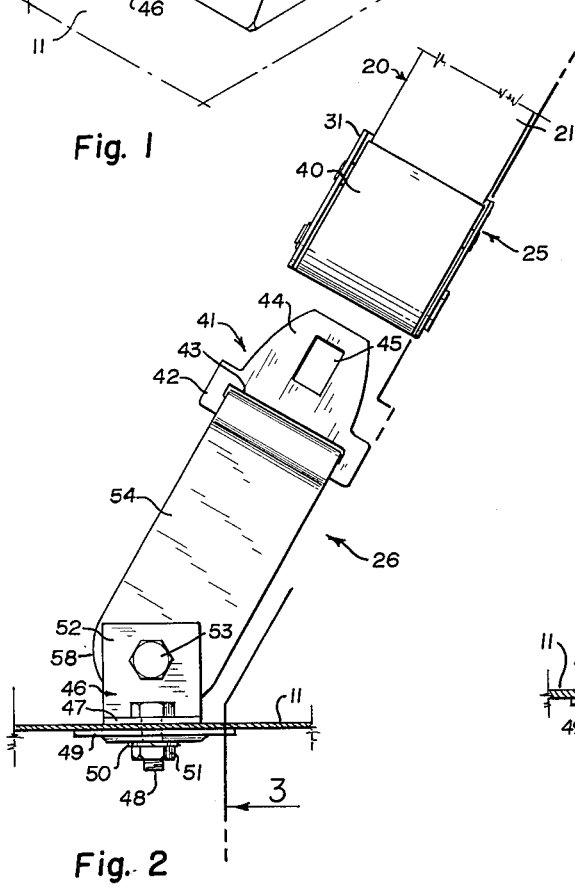
FIGURE 2 is a side elevational view of a portion of the safety belt shown at FIG. 1, as taken from the indicated arrow 2 at FIG. 1, but on an enlarged scale and with the components shown as being disconnected and slightly separated to better illustrate their individual constructions.
Figures 8, 9:
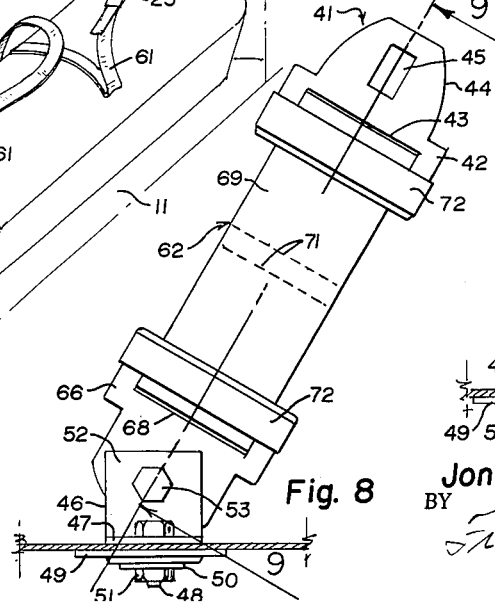

FIGURE 8 is a side elevational view similar to a portion of the showing at FIG. 2, but illustrating a modified embodiment of the connecting component disclosed in this invention.

FIGURE 9 is a sectional view as taken from the indicated line 9—9 at FIG. 8.

Referring more particularly to the drawing, the construction at FIG. 1 illustrates a portion of the interior of an automobile of an enclosed or hardtop type and of a type having individual seats. Only a single seat 10 is shown as being mounted upon the floor 11 of the automobile adjacent to the left door 12 of the automobile and with the door post 13 extending above and behind the seat thereof. This arrangement is commonly found in many types of sport cars and in other cars having individual seats for the driver and passengers.

The improved three-point belt 20 is especially adapted for use with automobiles of this type since the shoulder strap 21 may be secured to the door post 13 by a suitable anchor pin 22 at a point well above the shoulder of any passenger to extend therefrom diagonally across the seat back 14 to the opposite side of the seat when in use. The waist strap 23 is anchored to the floor 11 of the automobile, as at anchor 24 behind the seat and adjacent to the post 13 as indicated in broken lines at FIG. 1, and this waist strap will extend upwardly, forwardly, and across the seat cushion 15 to connect with the shoulder strap by a buckle 25, as will be further described.

This buckle 25 is adapted to be connected to my improved rigid connector arm 26 which upstands from the floor of the automobile adjacent to the inward side of the seat and this connector arm 30 is so proportioned as to extend upwardly to and at the approximate level of the seat cushion 15. This connection position, at the side of the wearer, will not cause tension of the shoulder strap to lift the waist strap when the belt is under tension, as in an accident.

The improved three-point belt is formed as a single extended strap including the shoulder strap portion 21 and waist strap portion 23, extending from a connection at the anchor pin 22 on the door post downwardly, diagonally across the seat, through and around the buckle 25, thence across the seat to form the waist strap 23, and thence downwardly to connect with the floor anchor 24. The belt itself is a simple woven strap preferably of nylon or like material of substantial strength to permit the belt to be a light-weight member.

In further detail, the connection of the shoulder strap 21 at the door post 13 consists of a simple clevis 27 attached to the anchor pin 22 which carries a flat D-ring buckle 28, having one side threaded through the clevis loop. A loop of the strap passed through the opening of this ring and a lock plate 29 is passed through the strap loop to rest upon the D-ring 28. This arrangement permits easy adjustment of the length of the belt at this point and the free end of the belt may be neatly and effectively secured to the shoulder strap by a simple, encircling rubber band 30 at its end.

The buckle 25 is a conventional type adapted to receive a metal tongue. The body portion is a flat U-shaped frame 31 having side walls 32. An adjustment bar 33 is mounted transversely across one end of this frame carried in longitudinal slots 34 in the walls 32. A transversely disposed opening 35 is formed in the floor 36 of the frame adjacent to the bar 33 by a U-shaped cut, and the metal at this opening is folded upwardly to form a transverse abutment 37 at the outward side of the post.

A transverse shaft 38 is mounted in the walls 32 at the other end of the buckle. This shaft carries a tongue-lock 39 at its center and this locks extends into a centered, suitable opening, not shown, in the floor 36 of the buckle. A lift lid 40 is also mounted on this shaft 38 and is adapted to be lifted to lift the tongue lock 39 out of position for release of a tongue as hereinafter described.

Figure 3:
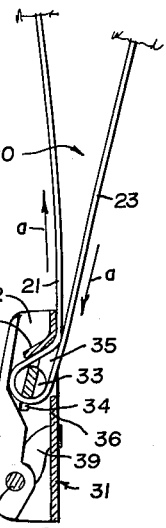
FIGURE 3 is an auxiliary edge view, partly in section, as taken from the indicated line 3—3 at FIG. 2.

The strap 21–23 is threaded onto this buckle by passing it through the opening 35 thence about the post 33 and again through the opening 35 as clearly shown at FIG. 3. The shoulder strap portion 21 wrapped about the bar 33 is extended thence as the waist strap 23 across the seat and downwardly to a conventional strap buckle or the like at the anchor 24, which is secured to the floor 11 at the back of the seat 10 as indicated in broken lines at FIG. 1. The details of this anchor 24 are not shown since any conventional fastener may be used.

The advantage of this construction of a single strap for the shoulder strap portion 21 and the waist strap portion 23 lies in properly threading the strap on the bar 33 of the buckle 25. The bar 33 permits adjustment of the strap in one direction with a slipping motion in that direction and a locking action in the opposite direction, the locking action being by movement of the strap against abutment 37. As shown by the indicated arrows "a" at FIGS. 1 and 3, this arrangement is such that the normal direction of belt slip is a movement of the waist strap 23 into the buckle 25 and of the shoulder strap 31 out of the buckle. Adjustment of a belt so arranged is simple. Once the three-point belt is donned and the buckle is connected, the waist strap is tightened by pulling up on the shoulder strap and then the shoulder strap is tightened at the buckle 28 on the door post 13. Not only does this movement of the strap through the buckle make adjustment easy, but also the locking action is properly directed in case of an accident. Whenever the belt is under a strain, as during a crash where the occupant's body is thrown forwardly the waist strap is locked against slipping.

It is important in the use of any type of safety belt which is strapped about the waist of a wearer to keep the belt actually about the pelvic bones so that whenever an accident occurs, the restraining pressure of the belt will be against the pelvic bones. Actually, strictly speaking, all such safety belts should be referred to as "pelvic belts" rather than waist belts. In the use of a waist belt only the proper position about the pelvis of the wearer is automatically assured because his body will always be thrown forwardly. However, in the use of a conventional type of three-point safety belt, of the type having the shoulder strap independently of the waist strap, the shoulder strap will hold the occupant's body upright and even in a position where the occupant is leaning backwardly against the seat back. In such a situation, in an accident, there is a possibility that the wearer's body will be thrust downwardly with an accompanying upward movement of the waist strap above the pelvis and into his comparatively soft and weak belly region. There the waist strap can cause serious injury to the viscera. Facilities to easily tighten the waist strap will prevent such.

The connector arm 26 is formed as a rigid upstanding member carrying a buckle tongue 41 at its top. This tongue is conventional and fits into the buckle 25 hereinbefore described. It is formed as a flat, metal member having a comparatively wide base 42 wherein a transversely disposed slot 43 is located, and a side-tapered tongue extension 44 having a rectangular orifice 45 therein. In conventional use, flexible straps are threaded through the slot 43 to connect the tongue to the buckle 25. The tapered tongue extension is pushed into the buckle between the frame and the lift lid to a position where the lock 39 falls through the tongue orifice 45. Disconnection is by lifting the lift lid.

This connector arm 26 is mounted upon the floor 11 of the automobile by a clip angle 46 having holes in each leg (shown in broken lines at FIG. 3). A base leg 47 is secured to the floor by an anchor bolt 48 passing through the hole of that leg and through a suitable hole in the floor of the vehicle. A suitable face washer 49, lock washer 50, and nut 51 complete this connection. The upstanding leg 52 of the clip angle has a pivot bolt 53 extending therethrough and the connector arm segment is attached to the leg 52 by this pivot bolt. The segment 54 itself is formed as a metal strap which is passed through the tongue-base slot 43 to be overfolded upon the tongue base as a flattened loop. An orifice 55 extends through each end of each overfolded portion of the strap. The orifices 55 lie in registration with each other and the pivot bolt 53 is passed through them. The bolt is secured thereto with a desired degree of snugness by a nut 56 and a lock nut 57. The end of this overfolded section is also rounded as at 58 to eliminate sharp corners and to permit it to be tipped to any selected position as to the inclined position illustrated in the drawing.

In actual use it is contemplated that the length of this connector arm is such that the top will be approximately level with the seat cushion. It may also be slightly below this level if desired. The advantages of this connector arm are immediately apparent. The arm is tilted to any position suitable for the wearer of the belt, and as he dons the three-point belt, it is simply a one-hand operation to fasten the buckle to the connector arm. When fastened, the lift lid 40 of the buckle will be positioned outwardly from the wearer and the buckle may be disconnected by a one-hand operation by simply reaching down to the buckle and pulling its lift lid outwardly. It is to be further noted that the buckle is at the top of the connector arm 26, at a position where it can be easily reached without looking for it. The wearer may simply slide his hand down across the shoulder strap 21, and his first contact will be with the buckle and its lift lid 40. No reaching about to find a disconnect lever is required.

When the three-point belt is not in use, it may be carried upon the door post 13 as by fastening the buckle to a clip 59 mounted on the door post immediately below the connection at pin 22, as in the manner illustrated at FIG. 4.

Various modifications and additions of this construction of an improved three-point belt 20 and of an improved and simplified connector arm 26 are possible. FIGS. 4 to 6 illustrate the use of the three-point belt 20 and connector arm 26 mounted in a convertible type of automobile, which requires the addition of an adaptor post 60 back of the seat to permit effective use of the three-point belt. FIG. 7 illustrates the connector arm 26 with a modified type of waist belt 61. FIGS. 8 and 9 illustrate an alternate construction of a connector arm 62 having a comparatively stiff, but resilient segment in it.

Referring to the construction at FIGS. 4 to 6, it is to be noted that many convertible type automobiles A' such as sport cars and certain styles of hardtop cars do not have any door post construction upstanding behind the seats of the automobiles and three-point belts are ordinarily not recommended for such automobiles. In the improved construction, an adaptor post 60, a rigid metal bar-like member, is secured to the body of the vehicle immediately behind the seat to upstand therefrom. This connection is by bolts 63 extending through suitable orifices 64, in the base portion of the post and through the frame A' of the automobile. The bolts are then secured by nuts 65. The top of the shoulder strap of the three-point belt 20 is fastened to the upper end of the post 60 as by an anchor pin 22 which holds a clevis 27 as hereinbefore described. Also, a clip 59 may be secured to this anchor post immediately or below the anchor pin to facilitate placing the strap in a suitable storage position when it is not in use as illustrated at FIG. 4. The construction of the three-point belt 20 and the connector arm 26 is substantially the same as that hereinbefore described.

The arrangement illustrated at FIG. 7 is especially adapted for the use of a waist belt type safety belt 61 in an automobile having a single wide seat 10" across the passenger compartment of the automobile A" and having a pair of safety belts 61 thereon. As in accordance with conventional practice, each waist belt 61 is affixed to the floor of the automobile behind the seat and near the center of the automobile (in a manner not shown) to extend upwardly therefrom and through the seat itself to extend from the trough 16" where the seat cushion 15" joins the seat back 14", as in the manner shown at FIG. 7. In the improved construction, instead of using a conventional and standard arrangement having each waist belt formed as two segments with the buckle connector being centered upon the wearer, a single strap is used which extends completely across the lap of the wearer, having a buckle 25 at its end, and a rigid connector segment 26 upstands from the side of the seat 10", as in the manner heretofore described. This arrangement permits the wearer to fasten the belt with one hand. All he must do is to grasp the buckle 25, bring it across his lap and down onto the rigid connector segment 26. A further advantage lies in the fact that with a single belt reach extending from the center of the automobile seat, the belt itself cannot fall out of the automobile door and be damaged or cause damage when the door is closed upon it.

A further modified construction is illustrated at FIG. 8, where a resilient connector segment 62 is used. As in the construction hereinbefore described, this unit is mounted upon the floor by a clip angle. A connector bolt 48 fastens the base flange 47 of the clip angle to the floor as aforedescribed. A flat base 66 is formed with an orifice 67 therein through which the pivot bolt 53 extends to fasten it to the upstanding flange 52 of the clip angle. The base is formed with a transverse slot 68 through which a belt segment 69 may pass. The tongue 41 is substantially the same as that hereinbefore described, including the base segment 42 having a transverse slot 43 therein. A woven strap 69 is threaded through the transverse slots 43 and 68 and is overlapped as at 70 to form a closed loop. It is held together by stitching 71. Retainer thimbles 72 are secured over the strap at the end of the base 66 and at the base segment 42 of the tongue.

This wrapped strap segment 68 is next impregnated with natural or synthetic rubber which can be cured or vulcanized to any suitable degree of resilience and stiffness. It is desired to use a rubber having a degree of stiffness sufficient to make the connector arm 62 stand up by itself and if bent over to return to a standing position.

With the flexible connector arm, it is possible to extend the tongue thereof to a level somewhat above the top of the seat cushion because no injury or accident will occur as where an individual is getting into or out of the car or across the seat space by sliding over the flexible tongue construction.

I have now described my invention in considerable detail; however, it is obvious that others skilled in the art can build and devise constructions which are within the spirit and scope of my inventon. Hence, I desire that my protection be limited, not by the constructions illustrated and described, but only by the proper scope of the appended claim.

I claim:

In the combination of a three point safety harness for a single passenger seat of a vehicle mounted upon the floor thereof and alongside and forwardly of a frame post thereof, wherein the safety harness includes a single, continuous strap with one portion thereof defining a shoulder strap having one end secured to the post at a position normally above an occupant's shoulder and extending downwardly and diagonally across the body of an occupant in the seat to the opposite side thereof, and another portion defining a pelvic strap having one end secured to the floor behind the seat, adjacent to the post member and extending upwardly and across an occupant's pelvis, with the extended end connecting with the extended end of the shoulder strap at the said opposite side of the seat, a buckle head slidably connecting with the continuous strap member at the extended ends of the shoulder and pelvic strap portions and a tongue member connected to the vehicle floor at the said opposite side of the seat carrying buckle connector means adapted to engage with the buckle head, the improvement comprising:

a directional strap-lock means in the buckle head engaging with the strap and permitting the strap to be moved in the buckle head to tighten the pelvic strap portion about the pelvis of an occupant but locking against movement in the opposite direction, whereby to permit adjustments of the safety harness to tighten the pelvic strap portion by a simple pull of the shoulder strap portion and to prevent loosening of the pelvic strap portion in the event of an accident where an occupant is thrown forwardly against the harness.

References Cited by the Examiner

UNITED STATES PATENTS

| | | | |
|---|---|---|---|
| 2,833,555 | 5/1958 | Zotkewicz | 297—389 |
| 2,997,341 | 8/1961 | Borgia | 297—385 |
| 3,043,625 | 7/1962 | Bohlin | 297—389 |
| 3,083,035 | 3/1963 | Ottosson | 297—389 |

FOREIGN PATENTS

| | | |
|---|---|---|
| 1,186,353 | 2/1959 | France. |
| 1,277,656 | 10/1961 | France. |

FRANK B. SHERRY, *Primary Examiner.*

J. S. PETRIE, R. B. FARLEY, *Assistant Examiners.*